United States Patent
Huang et al.

(10) Patent No.: US 11,270,519 B2
(45) Date of Patent: Mar. 8, 2022

(54) METHOD OF PROCESSING POINT CLOUD DATA BASED ON NEURAL NETWORK

(71) Applicant: SHENZHEN UNIVERSITY, Guangdong (CN)

(72) Inventors: Hui Huang, Guangdong (CN); Kangxue Yin, Guangdong (CN); Hao Zhang, Guangdong (CN); Cohen Or Daniel, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 372 days.

(21) Appl. No.: 16/487,319

(22) PCT Filed: Nov. 23, 2018

(86) PCT No.: PCT/CN2018/117126
§ 371 (c)(1),
(2) Date: Aug. 20, 2019

(87) PCT Pub. No.: WO2020/073444
PCT Pub. Date: Apr. 16, 2020

(65) Prior Publication Data
US 2021/0366203 A1 Nov. 25, 2021

(30) Foreign Application Priority Data
Oct. 12, 2018 (CN) .......................... 201811190592.2

(51) Int. Cl.
*G06T 19/20* (2011.01)
*G06T 7/60* (2017.01)
*G06N 3/02* (2006.01)

(52) U.S. Cl.
CPC .............. *G06T 19/20* (2013.01); *G06N 3/02* (2013.01); *G06T 7/60* (2013.01);
(Continued)

(58) Field of Classification Search
CPC ......... G06T 19/00; G06T 17/20; G06T 17/00; G06T 15/10; G06T 15/00; G06T 19/20; G06T 7/60; G06N 3/02
See application file for complete search history.

(56) References Cited

U.S. PATENT DOCUMENTS

2015/0154795 A1    6/2015  Ogale

FOREIGN PATENT DOCUMENTS

| CN | 105809118 A | 7/2016 |
|---|---|---|
| CN | 107292234 A | 10/2017 |

(Continued)

OTHER PUBLICATIONS

International Search Report dated Oct. 12, 2018 in PCT/CN2018/117126 (4 pages).
(Continued)

*Primary Examiner* — Todd Buttram
(74) *Attorney, Agent, or Firm* — Polsinelli PC

(57) ABSTRACT

The disclosure relates processing point cloud data based on a neural network. The method includes: acquiring first point set data and second point set data respectively representing a point data set of an outer surface of a target object in different shapes; processing the first point set data using structure parameters of the neural network to obtain a multi-scale feature of each point in the first point set data; acquiring target point set data according to the first displacement vector, the first point set data and the second point set data. The method of processing the point cloud data provided in the present application can implement shape conversion of the point cloud.

9 Claims, 4 Drawing Sheets

(52) U.S. Cl.
CPC .............. *G06T 2207/10028* (2013.01); *G06T 2207/20084* (2013.01); *G06T 2210/56* (2013.01); *G06T 2219/2021* (2013.01)

(56) References Cited

FOREIGN PATENT DOCUMENTS

| | | |
|---|---|---|
| CN | 108230329 A | 6/2018 |
| CN | 108596961 Y | 9/2018 |
| WO | WO-2020073444 A1 * | 4/2020 |

OTHER PUBLICATIONS

Written Opinion dated Oct. 12, 2018 in PCT/CN2018/117126 (3 pages).

\* cited by examiner

METHOD OF PROCESSING POINT CLOUD DATA BASED ON NEURAL NETWORK

CROSS-REFERENCE TO RELATED APPLICATIONS

This application is a National Phase of International Application No. PCT/CN2018/117126, filed on Nov. 23, 2018, which claims priority to Chinese Patent Application No. 2018111905922, entitled "METHOD AND APPARATUS OF PROCESSING POINT CLOUD DATA BASED ON NEURAL NETWORK" filed on Oct. 12, 2018, the contents of which are expressly incorporated by reference herein in their entireties.

TECHNICAL FIELD

The disclosure relates to the field of human neural networks, and in particular to a method of processing point cloud data based on a neural network.

BACKGROUND

Point cloud data refers to scanning data recorded in the form of points, each point containing three-dimensional coordinates. Some points can contain position information, color information, or reflection intensity information. As a basic form of shape expression, the point cloud formed by the point cloud data collection has the advantages of simple, flexible and accessible etc. Thus, the point cloud has unique advantages and applications in the field of image transformation. In recent years, many scholars have made extensive and in-depth research on point clouds.

At present, works applying neural network into the processing of point cloud data includes PointNet and PointNet++ etc. Both works aggregate the point clouds to be converted into local features or global features of the point clouds by extracting the characteristics of each point in the point cloud. The classification and segmentation of the point clouds are implemented according to the local features or global features of the point clouds.

However, the above described method of processing the point cloud data cannot implement the shape conversion of the point cloud.

SUMMARY

Accordingly, in view of the above technical problems, it is necessary to provide a method and apparatus of processing point cloud data based on a neural network capable of implementing shape conversion of point clouds.

In a first aspect, a method of processing point cloud data based on a neural network, the method includes:

acquiring first point set data and second point set data; the first point set data and the second point set data respectively representing a point data set of an outer surface of a target object in different shapes;

processing the first point set data using structure parameters of the preset neural network to obtain a multi-scale feature of each point in the first point set data;

the structure parameters include a collection abstraction layer parameter, a feature propagation layer parameter, and a fully connected layer parameter;

acquiring a first displacement vector of each point in the first point set data according to the multi-scale feature and a preset noise; and acquiring target point set data according to the first displacement vector, the first point set data, and the second point set data.

In a second aspect, the present disclosure provides a computer device including a memory and a processor, the memory storing a computer program which, when executed by the processor, causing the processor to perform the flowing method:

acquiring first point set data and second point set data; the first point set data and the second point set data respectively representing a point data set of an outer surface of a target object in different shapes;

processing the first point set data using structure parameters of the preset neural network to obtain a multi-scale feature of each point in the first point set data;

the structure parameters includes a collection abstraction layer parameter, a feature propagation layer parameter, and a fully connected layer parameter;

acquiring a first displacement vector of each point in the first point set data according to the multi-scale feature and a preset noise; and acquiring target point set data according to the first displacement vector, the first point set data, and the second point set data.

In a third aspect, the present disclosure provides a computer-readable storage medium storing a computer program which, when executed by a processor, causing the processor to perform the following steps:

acquiring first point set data and second point set data; the first point set data and the second point set data respectively representing a point data set of an outer surface of a target object in different shapes;

processing the first point set data using structure parameters of the preset neural network to obtain a multi-scale feature of each point in the first point set data;

the structure parameters include a collection abstraction layer parameter, a feature propagation layer parameter, and a fully connected layer parameter;

acquiring a first displacement vector of each point in the first point set data according to the multi-scale feature and a preset noise; and acquiring target point set data according to the first displacement vector, the first point set data, and the second point set data.

A method and apparatus of processing point cloud data based on a neural network according to the present application includes acquiring first point set data and second point set data; the first point set data and the second point set data respectively represent a point data set of an outer surface of a target object in different shapes; processing the first point set data using structure parameters of the preset neural network to obtain a multi-scale feature of each point in the first point set data; the structure parameters include a collection abstraction layer parameter, a feature propagation layer parameter, and a fully connected layer parameter; acquiring a first displacement vector of each point in the first point set data according to the multi-scale feature and the preset noise; acquiring target point set data according to the first displacement vector, the first point set data, and the second point set data. Since the first displacement vector is a displacement vector corresponding to each point in the first point set data, thus, each point in the target point set data acquired according to the first displacement vector, the first point set data, and the second point set data has a transformation relationship on displacement with each point in the first point set data, and the shape of the point cloud corresponding to the point set data formed by the points with different displacements is different, so the method of processing the point cloud data proposed in this application can implement the shape conversion of the point cloud.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

Figure 1:
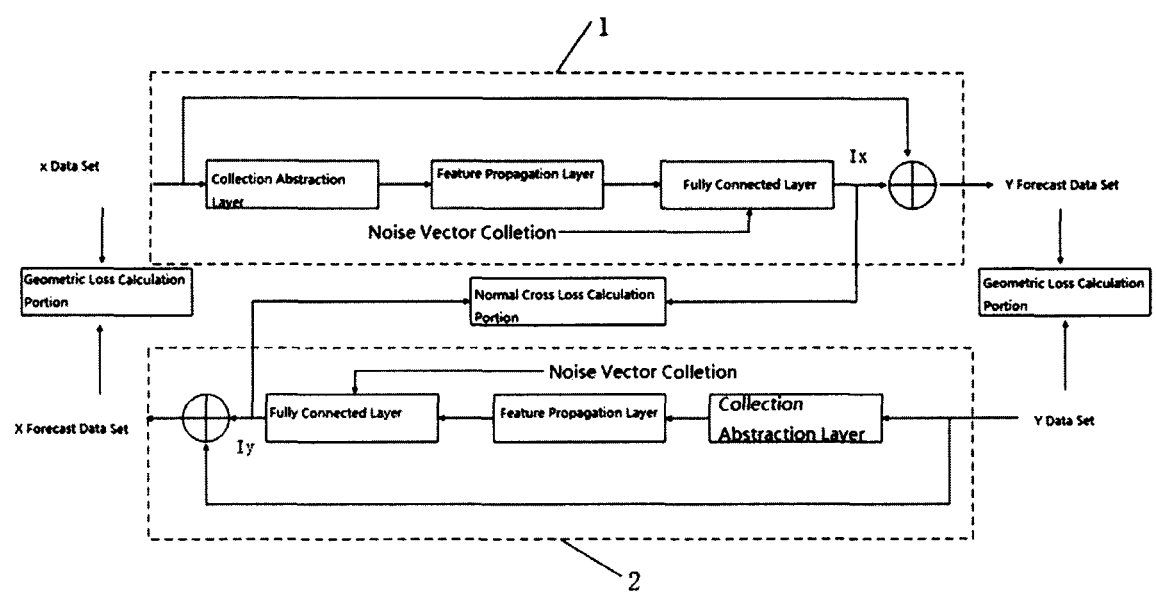
FIG. 1 is a schematic diagram of an application scenario according to an embodiment.

The method of processing the point cloud data based on the neural network provided in the embodiments of the present application can be applied to the neural network system as shown in FIG. 1. The system includes a neural network branch 1 and a neural network branch 2, each includes a collection abstraction layer, a feature propagation layer, a fully connected layer and an adder. The collection abstraction layer is configured to acquire the point features corresponding to the input data set; the feature propagation layer is configured to output multi-scale feature of each point in the data set; the fully connected layer is configured to process the multi-scale feature and the noise vector of each point in the data set to output a displacement vector corresponding to each point in the data set; the adder is configured to output forecast data set by add operation on the displacement vector corresponding to each point in the data set. Alternatively, the neural network system can further include a geometric loss calculation portion, a normal cross loss calculation portion, and the geometric loss calculation portion is configured to calculate a geometric difference between two data sets; the normal cross loss calculation portion is configured to calculate parallelism between the two displacement vectors.

The technical solution of the present disclosure will be described below in detail with specific embodiments. The following specific embodiments can be combined with each other, description of the same or similar concepts or processes may be omitted for brevity.

Figure 2:
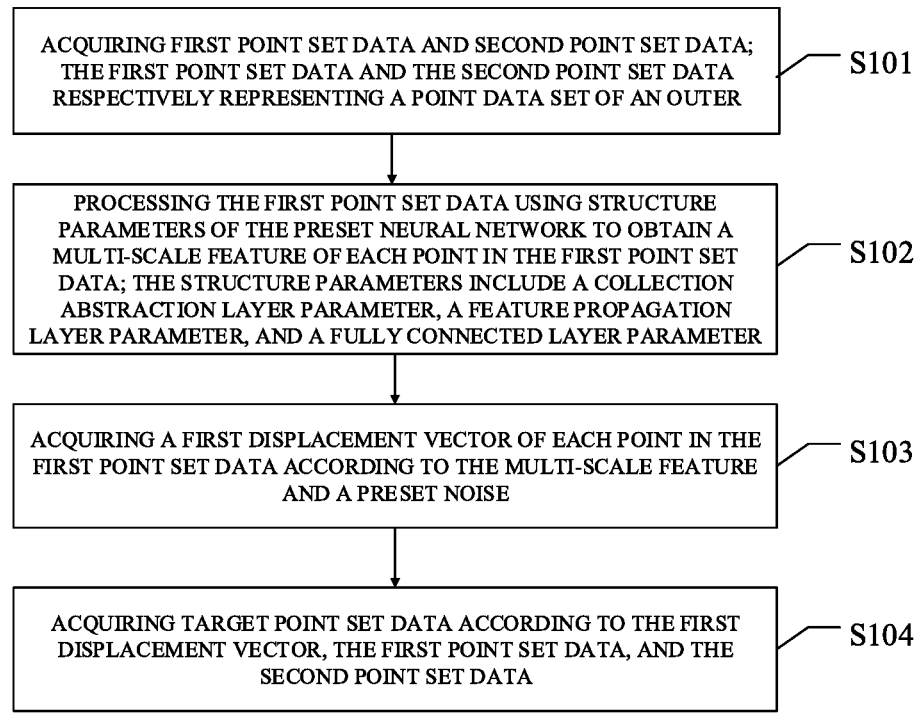
FIG. 2 is a flowchart of a method of processing point cloud data based on a neural network according to an embodiment.

FIG. 2 is a flowchart of a method of processing point cloud data based on a neural network according to an embodiment. The present embodiment relates to the processing of point cloud data using a neural network algorithm to implement a process in which geometric shapes of two target objects are convertable to each other. The execution subject of the method is a computer device. As shown in FIG. 2, the method includes the following steps:

At step S101: a first point set data and a second point set data are acquired; the first point set data and the second point set data respectively represent a point data set of an outer surface of a target object in different shapes.

Both the first point set data and the second point set data can include point cloud data, the point cloud data refers to a set of vectors in a three dimensional coordinates system. The vectors are typically represented in the form of (x, y, z) three dimensional coordinates. It is mainly configured to represent the outer surface shape of the target object. For example, the first point set data can be surface point set data under a skeleton shape of an aircraft model, and the corresponding second point set data can be surface point set data under the complete shape of the aircraft model; the first point set data can also be surface point set data under a two-dimensional contour shape of the aircraft model, and the corresponding second point set data can be surface point set data under three-dimensional contour shape of the aircraft model.

In the embodiment, both the first point set data and the second point set data can be generated by scanning a target object by 3D scan devices. The scan devices can automatically acquire information of points on the surface of the target object. The information of these points is then outputted in the form of some data file to form a first point set data or a second point set data. The first point set data or the second point set data are then transmitted to the computer device connected to the scanning devices, thereby enabling the computer device to acquire the first point set data or the second point set data outputted by the scanning devices. For example, a lidar a stereo camera, a time-of-flight camera and other scanning devices can all implement collection of information of points on the surface of a target object and transmit the collected first point set data or a second point set data to a computer device so as to enable the computer device to process with the next processing of the first point set data or the second point set data.

Alternatively, the computer device can also download directly from the network or acquire from a database to obtain first or second point set data corresponding to the target object. The manner in which the computer device acquires the first point set data or the second point set data can be determined according to the actual situation, and the present embodiment is not limited thereto.

At step S102: the first point set data is processed using structure parameters of the preset neural network to obtain a multi-scale feature of each point in the first point set data; the structure parameters include a collection abstraction layer parameter, a feature propagation layer parameter, and a fully connected layer parameter.

In the embodiment, the structure of the preset neural network can include a plurality of layer structures. As shown in FIG. 1, the structure of the preset neural network can include a collection abstraction layer, a feature propagation layer, a full connection layer, etc., and the layers are interconnected to each other. Different parameters are preset at each layer, and the different parameters are configured to perform different processing on the first point set data. Alternatively, the collection abstraction layer is configured to output a point feature corresponding to each point in the first point set data or to output a point feature corresponding to each point in the second point set data according to the input first point set data or the second point set data; the feature propagation layer is configured to output a multi-scale feature of each point according to each point feature outputted by the collection abstraction layer connected to the feature propagation layer; the fully connected layer is configured to output a displacement vector corresponding to each point according to the multi-scale feature of each point outputted by the feature propagation layer connected thereto.

In the embodiment, the first point set data is inputted into a structure of a preset neural network, and a collection abstraction layer in the structure of the neural network processes the first point set data to obtain a point feature corresponding to each point in the first point set data. Further, the point feature is inputted into a feature propagation layer in the structure of the neural network, and the feature propagation layer processes each point feature in the first point set data to obtain a multi-scale feature of each point in the first point set data.

At step S103: a first displacement vector of each point in the first point set data is acquired according to the multi-scale feature and a preset noise.

The preset noise can include at least one of random noise, Gaussian noise, or Gaussian white noise, and the selection of the preset noise can be determined according to the actual situation, which is not limited in the embodiment. The first displacement vector is configured to represent an amount of displacement change of each point in the first point set data in a certain direction.

In the embodiment, when the computer device processes the first point set data to obtain a multi-scale feature of each point in the first point set data, the multi-scale feature and the preset noise, both of which are inputted into a preset neural network. The multi-scale feature and the preset noise are processed through a fully connected layer in the neural network to output a first displacement vector for each point in the first point set data.

At step S104: target point set data is acquired according to the first displacement vector, the first point set data, and the second point set data.

The target point set data is configured to represent the point set data after the shape transformation of the point set data of the surface of the target object. For example, after the shape transformation, the point set data corresponding to the skeleton shape of the target object forms the point set data corresponding to the complete shape of the target object, and the point set data is the target point set data.

In the embodiment, when the computer device processes the first point set data and acquires the first displacement vector corresponding to each point in the first point set data, the vector of each point in the first point set data and the first displacement vector corresponding to each point can be added or weighted etc., to obtain an operation result. The operation result and the second point set data can be compared and analyzed etc., to obtain target point set data. Alternatively, a preset loss calculation method can be adopted to calculate a difference value between the operation result and the second point set data, thereby obtaining the target point set data according to the difference value.

In the above embodiment, the computer device acquires the first point set data and the second point set data; the first point set data and the second point set data are configured to represent a point data set of an outer surface of a target object; processes the first point set data using structure parameters of the preset neural network to obtain a multi-scale feature of each point in the first point set data; the structure parameters include a collection abstraction layer parameter, a feature propagation layer parameter, and a fully connected layer parameter; acquiring a first displacement vector of each point in the first point set data according to the multi-scale feature and the preset noise; acquiring target point set data according to the first displacement vector, the first point set data, and the second point set data. Since the first displacement vector is a displacement vector corresponding to each point in the first point set data, thus, each point in the target point set data acquired according to the first displacement vector, the first point set data, and the second point set data has a transformation relationship on displacement with each point in the first point set data and the shape of the point cloud corresponding to the point set data formed by the points with different displacements is different, so the method of processing the point cloud data proposed in this application can implement the shape conversion of the point cloud.

Figure 3:
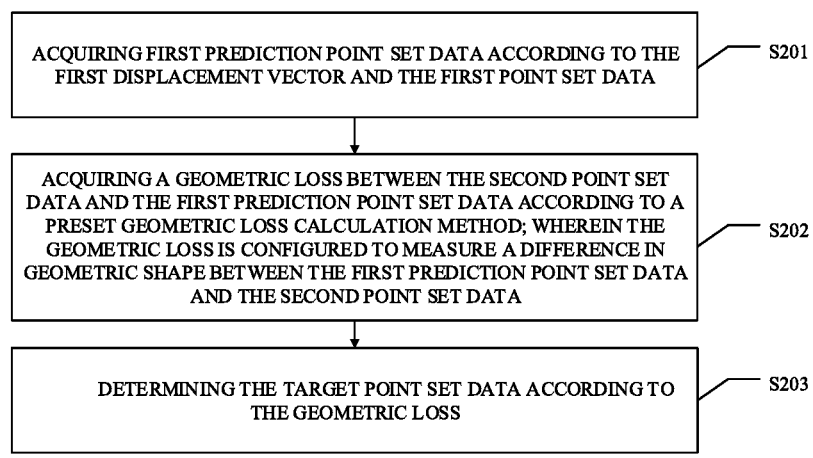
FIG. 3 is a flowchart of an implementation of step S104 according to the embodiment of FIG. 2.

FIG. 3 is a flow chart of an implementation of S104 in the embodiment of FIG. 2. The embodiment relates to a specific process for the computer device to acquire a target point set data. As shown in FIG. 3, the step S104 "acquiring target point set data according to the displacement vector, the first point set data and the second point set data", includes the following steps of:

At step S201: first prediction point set data is acquired according to the first displacement vector and the first point set data.

In the embodiment, when the computer device acquires the first displacement vector corresponding to each point in the first point set data, the vector of each point in the first point set data can be added to the first displacement vector corresponding to each point to obtain the first prediction point set data.

At step S202: a geometric loss between the second point set data and the first prediction point set data is acquired according to a preset geometric loss calculation method; and the geometric loss is configured to measure a difference in geometric shape between the first prediction point set data and the second point set data.

In the embodiment, the preset geometric loss calculation method can include various loss functions. And each of the loss functions can be configured to calculate the geometric loss between the second point set data and the first prediction point set data so that the computer device can determine whether there is a difference in geometric shape between the first prediction point set data and the second point set data according to the geometric loss value, how large is the difference, and whether further processing of the first prediction point set data is required.

At step S203: the target point set data is determined according to the geometric loss.

In the embodiment, when the computer device calculates and obtains the geometric loss between the second point set data and the first prediction point set data, structure parameters of the preset neural network can be adjusted according to the geometric loss value. By returning to perform step S102 and the subsequent steps, the target point set data can be further determined.

In the above embodiment, the computer device acquires the first prediction point set data according to the displacement vector and the first point set data; acquires the geometric loss between the second point set data and the first prediction point set data according to a preset geometric loss calculation method; the geometric loss is configured to measure the difference in geometric shape between the first prediction point set data and the second point set data; and the target point set data is determined by the geometric loss. In this method, the geometric loss is configured to measure the difference in geometric shape between the first prediction point set data and the second point set data, and the target point set data is determined according to the difference, so that the accuracy of the target point set data is higher.

Figure 4:
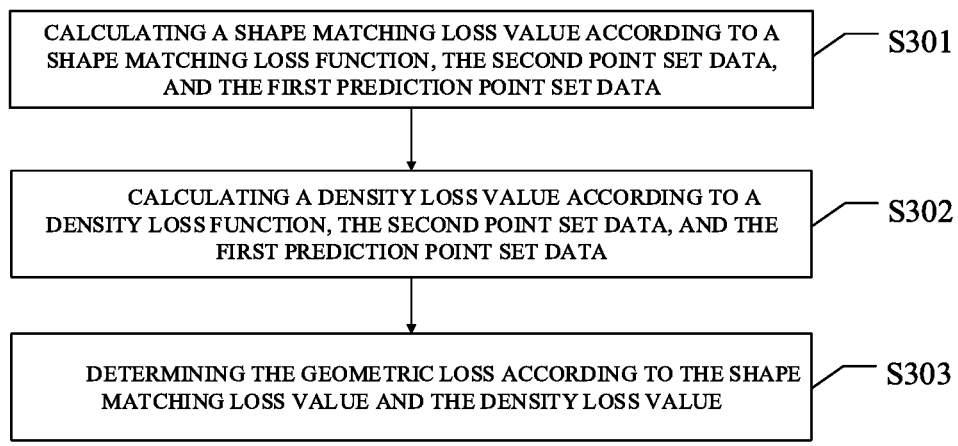
FIG. 4 is a flowchart of a method of processing point cloud data based on a neural network according to an embodiment.

Alternatively, in one of the embodiments, as shown in FIG. 4, S202 "a geometric loss between the second point set data and the first prediction point set data is acquired according to a preset geometric loss calculation method" includes the following steps:

At step S301: a shape matching loss value is calculated according to a shape matching loss function, the second point set data, and the first prediction point set data.

In the embodiment, alternatively, the preset geometric loss calculation method can include a shape matching loss function. The shape matching loss function is configured to measure the degree of matching between the first prediction point set data and the second point set data; the degree of matching can be represented by a shape matching loss value. The larger the shape matching loss value, the lower the degree of matching, that is to say, the more the first prediction point set data and the second point set data do not match each other; the smaller the shape matching loss value, the higher the degree of matching, that is to say, the more the first prediction point set data and the second point set data match each other. The shape matching loss value can be calculated and obtained by substituting the first prediction point set data and the second point set data as variables into the shape matching loss function.

Alternatively, in one of the embodiments, the shape matching loss function can include the following expression (1):

$$L_{shape}(\hat{Y}, Y) = \sum_{p \in Y} \min_{q \in \hat{Y}} d(p, q) + \sum_{q \in \hat{Y}} \min_{p \in Y} d(p, q); \tag{1}$$

in the above formula, Y represents the second point set, $\hat{Y}$ represents the first prediction point set data, p represents points in the second point set data, q represents points in the first prediction point set data, and d(p,q) represents an Euclidean distance between p points and q points, and $L_{shape}(\hat{Y},Y)$ represents the shape matching loss value corresponding to the geometric loss between the first prediction point set data $\hat{Y}$ and the second point set data Y.

At step S302: a density loss value is calculated according to a density loss function, the second point set data, and the first prediction point set data.

In the embodiment, alternatively, the preset geometric loss calculation method can include a density loss function. The density loss function is configured to measure the difference in local point density between the first prediction point set data and the second point set data. The difference in density can be expressed as a density difference loss value, and the larger the density difference loss value, the greater the difference in local point density between the first prediction point set data and the second point set data; the smaller the density difference loss value, the smaller the difference in local point density between the first prediction point set data and the second point set data. The density difference loss value can be calculated and obtained by substituting the first prediction point set data and the second point set data as variables into the density loss function.

Alternatively, in one of the embodiments, the density loss function can include the following expression (2):

$$L_{density}(\hat{Y}, Y) = \frac{1}{k} \sum_{p \in Y} \sum_{i=1}^{k} |d(p, N_i(Y, p)) - d(p, N_i(\hat{Y}, p))|; \tag{2}$$

in the above formula, $N_i(Y,p)$ represents the ith point closest to the point p in the Y point set, $N_i(\hat{Y},p)$ represents the ith point closest to the point p in the $\hat{Y}$ point set, k represents the number of points closest to the point p in the Y point set or the number of points closest to the point p in the $\hat{Y}$ point set, $d(p,N_i(Y,p))$ represents the Euclidean distance between a p point and a point in the Y point set closest to the p point; $d(p,N_i(\hat{Y},p))$ represents the Euclidean distance between a p point and a point in the Y point set closest to the p point; and $L_{density}(\hat{Y},Y)$ represents the density loss value corresponding to the geometric loss between the first prediction point set data $\hat{Y}$ and the second point set data Y.

At step S303: the geometric loss is determined according to the shape matching loss value and the density loss value.

In the embodiment, the preset geometric loss calculation method can include one or two kinds of loss function(s) of the shape matching loss function and the density loss function. Alternatively, when the preset geometric loss calculation method includes only the shape matching loss function, the computer device can determine the geometric loss according to the shape matching loss value, and the geometric loss can be expressed by the above relationship (1). Alternatively, when the preset geometric loss calculation method includes only the density loss function, the computer device can determine the geometric loss according to the density loss value, and the geometric loss can be expressed by the above relationship (2).

Alternatively, when the preset geometric loss calculation method includes a shape matching loss function and a density loss function, the geometric loss can be expressed by the following relation (3) or a variant thereof:

$$L_{X \to Y}(D) = \frac{1}{k} \sum_{\{X,Y\} \in D} (L_{shape}(\hat{Y}, Y), \lambda L_{density}(\hat{Y}, Y)); \tag{3}$$

In the above formula, $L_{shape}(\hat{Y},Y)$ represents the shape matching loss value corresponding to the geometric loss between the first prediction point set data $\hat{Y}$ and the second point set data Y; $L_{density}(\hat{Y},Y)$ represents the density loss value corresponding to the geometric loss between the first prediction point set data $\hat{Y}$ and the second point set data Y; $L_{X \to Y}(D)$ represents a geometric loss value when the first point set data X is converted to the second point set data Y. D represents a training set and $\lambda$ represents a default parameter which is generally defined as 1, and other parameters are the same as above.

Figure 5:
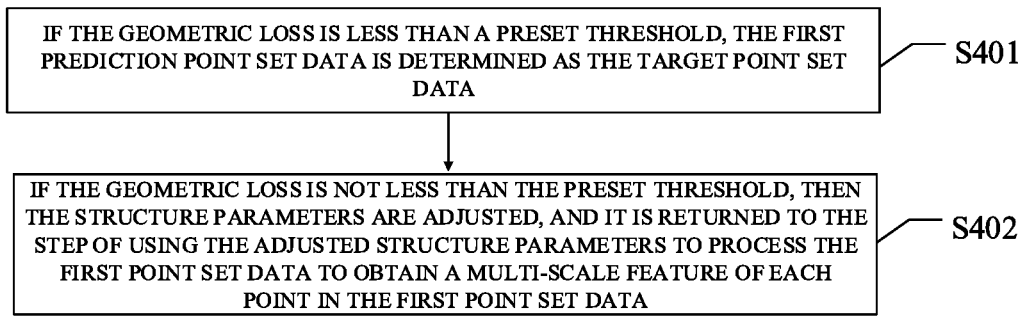
FIG. 5 is a flowchart of an implementation of step S104 according to the embodiment of FIG. 3.

FIG. 5 is a flowchart of an implementation way of S203 in the embodiment of FIG. 3. According to the above embodiment, as shown in FIG. 5, step S203 "the target point set data is determined according to geometric loss" includes the following steps:

At step S401: if the geometric loss is less than a preset threshold, the first prediction point set data is determined as the target point set data.

In the embodiment, the preset threshold can be set by the user as an evaluation index for determining whether the first prediction point set data can satisfy the expected result of the user. Alternatively, if the geometric loss calculated and obtained by the computer device is less than a preset threshold, it can be determined that the first prediction point set data corresponding to the geometric loss conforms to an expected result of the user, and the first prediction point set data is further determined as target point set data.

At step S402: if the geometric loss is not less than the preset threshold, then the structure parameters are adjusted, and it is returned to the step of using the adjusted structure parameters to process the first point set data to obtain a multi-scale feature of each point in the first point set data.

Alternatively, if the geometric loss is not less than the preset threshold, it can be determined that the first prediction point set data corresponding to the geometric loss does not conform to the expected result of the user, and further processing is required. The processing can include adjusting the structure parameters of the preset neural network, further the aforementioned step S102 can be returned to according to the adjusted structure parameters, and the step S102 and subsequent steps can be started to be performed, until the computer device calculates and obtains that the geometric loss between the second point set data and the first prediction point set data is less than a preset threshold, then the first prediction point set data is determined as the target point set data.

In the above embodiment, if the geometric loss is less than the preset threshold, then the first prediction point set data is determined as the target point set data; if the geometric loss is not less than the preset threshold, then the structure parameters are adjusted, and return to the step of using the adjusted structure parameters to process the first point set data to obtain a multi-scale feature of each point in the first point set data. Since the process is a process of iteratively calculating the geometric loss so that the geometric loss is less than a preset threshold whereby the first prediction point set data is determined. Thus, the first prediction point set data determined by the process is of higher accuracy.

Figure 6:
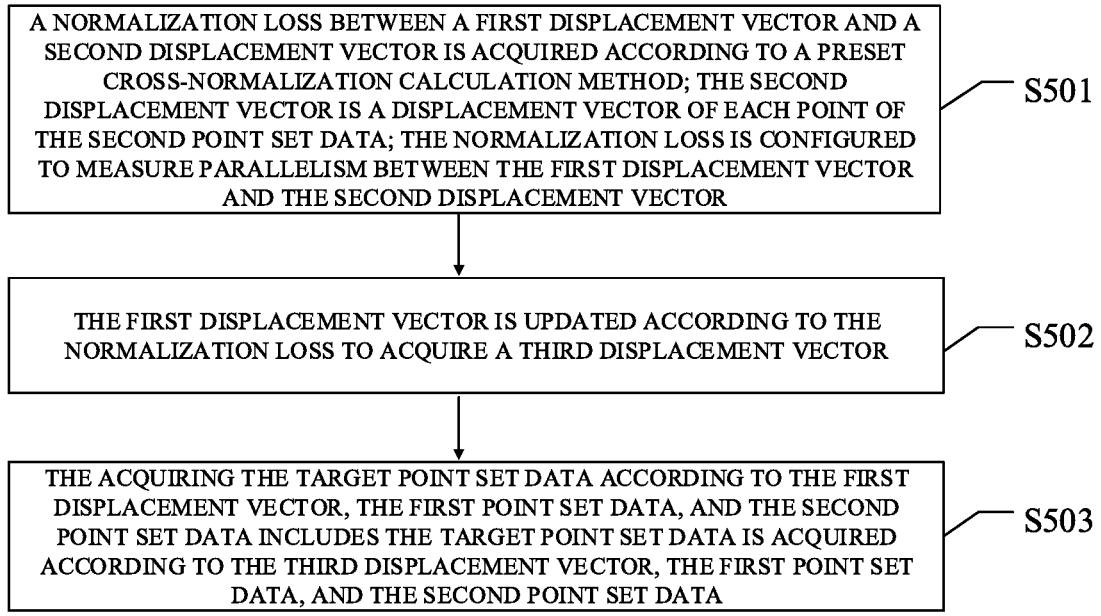
FIG. 6 is a flowchart of a method of processing point cloud data based on a neural network according to an embodiment.

FIG. 6 is a flowchart of a method of processing point cloud data based on a neural network according to an embodiment. This embodiment relates to the process of processing the first displacement vector after the aforementioned step S103 "a first displacement vector of each point in the first point set data is acquired according to the multi-scale feature and a preset noise". As shown in FIG. 6, the method includes the following steps:

At step S501: a normalization loss between a first displacement vector and a second displacement vector is acquired according to a preset cross-normalization calculation method; the second displacement vector is a displacement vector of each point of the second point set data; the normalization loss is configured to measure parallelism between the first displacement vector and the second displacement vector.

In the embodiment, the preset cross-normalization calculation method is configured to calculate the normalization loss between the first displacement vector and the second displacement vector, so that the computer device can determine whether the first displacement vector is parallel to the second displacement vector according to the normalization loss value, and how large parallelism difference is, and whether further processing is required for the first displacement vector and the second displacement vector. For example, the larger the normalization loss value, the smaller the parallelism between the first displacement vector and the second displacement vector, the smaller the normalization loss value, and the greater the parallelism between the first displacement vector and the second displacement vector is.

Alternatively, in one of the embodiments, the preset cross-normalization calculation method can include a loss function, which can be expressed using the following relationship (4) or a variant relationship thereof:

$$L_{reg}(X, Y) = \sum_{p \in X} \min_{q \in Y} d([p, p + I_X(p)], [q + I_Y(q), q]) + \sum_{q \in Y} \min_{p \in X} d([p, p + I_X(p)], [q + I_Y(q), q]); \quad (4)$$

$I_X(p)$ represents the first displacement vector corresponding to the p point in the X point set, $I_Y(q)$ represents the second displacement vector corresponding to the q point in the Y point set, $L_{reg}(X,Y)$ represents the normalization loss value between the first displacement vector and the second displacement vector, and $d([p,p+I_X(p)],[q+I_Y(q),q])$ represents the Euclidean distance between vectors $[p,p+I_X(p)]$ and $[q+I_Y(q),q]$.

At step S502: the first displacement vector is updated according to the normalization loss to acquire a third displacement vector.

In the embodiment, when the computer device calculates and obtains the normalization loss between the first displacement vector and the second displacement vector, the structure parameters of the preset neural network can be adjusted according to the normalization loss value. It is performed from step S102, thereby updating the first displacement vector to acquire the third displacement vector.

At step S503: the acquiring the target point set data according to the first displacement vector, the first point set data, and the second point set data includes the target point set data is acquired according to the third displacement vector, the first point set data, and the second point set data.

In the embodiment, when the computer device acquires the first displacement vector according to the first point set data and acquires the second displacement vector according to the second point set data, the normalization loss between the first displacement vector and the second displacement vector is calculated, then the parallelism between the first displacement vector and the second displacement vector is measured according to the obtained normalization loss. If the parallelism is high, the first displacement vector is updated to acquire the third displacement vector, and then the target point set data is acquired according to the third displacement vector, the first point set data, and the second point set data; if the parallelism is low, the structure parameters of the preset neural network are adjusted, and the aforementioned step S102 is returned to according to the adjusted structure parameters, and the step S102 and subsequent steps are started to be performed until the parallelism between the first displacement vector and the second displacement vector calculated and obtained by the computer device can satisfy the user's needs.

In the above embodiment, the normalization loss between the first displacement vector and the second displacement vector is acquired according to a preset cross-normalization calculation method; the second displacement vector is a displacement vector of each point of the second point set data; the normalization loss is configured to measure parallelism between the first displacement vector and the second displacement vector; the first displacement vector is updated according to the normalization loss to obtain the third displacement vector; the target point set data is acquired according to the third displacement vector, the first point set data, and the second point set data. Since the third displacement is the updated first displacement vector, the accuracy of the third displacement vector is relatively high, and the accuracy of the target point set data determined according to the third displacement vector, the first point set data, and the second point set data is relatively high.

It should be noted that when the computer device calculates and obtains the geometric loss portion and the normal cross loss portion, the embodiment can further include: a total network loss of the preset neural network is calculated and obtained according to the geometric loss portion and the normal cross loss portion. The total network loss is configured to measure a conversion accuracy of the first point set data and a conversion accuracy of the second point set data when the first point set data and the second point set data are processed using a preset neural network. When the computer device acquires the total network loss, the structure parameters of the preset neural network are adjusted according to the total network loss, thereby obtaining the first prediction point set data with higher accuracy or the second prediction point set data with higher accuracy.

Alternatively, when in the application scenario as shown in FIG. 1, the above-mentioned total network loss can be expressed by the following relation (5) or a variant relation thereof:

$$L_{loss} = L_{X \to Y}(D) + L_{Y \to X}(D) + \mu \sum_{\{X,Y \in D\}} L_{reg}(X, Y); \quad (5)$$

In the above formula, $L_{loss}$ represents the total network loss, $L_{X \to Y}(D)$ represents the geometric loss of the neural network branch 1, $L_{Y \to X}(D)$ represents the geometric loss of the neural network branch 2, $L_{reg}(X,Y)$ represents the normalization loss, and $\mu$ represents a balance parameter, and the default value being 0.1.

It should be appreciated that although the various steps in the flowcharts of FIGS. 2 to 6 are shown sequentially as indicated by the arrows, these steps are not necessarily performed sequentially in the order indicated by the arrows. The performance of these steps is not critical to the order in which they are performed unless explicitly stated herein, and the steps may be performed in other orders. Moreover, at least a part of the steps in FIGS. 2 to 6 may include a plurality of sub-steps or stages, which are not necessarily performed at the same time, but may be performed at different times, and the order in which the sub-steps or stages are performed is not necessarily performed sequentially.

Figure 7:
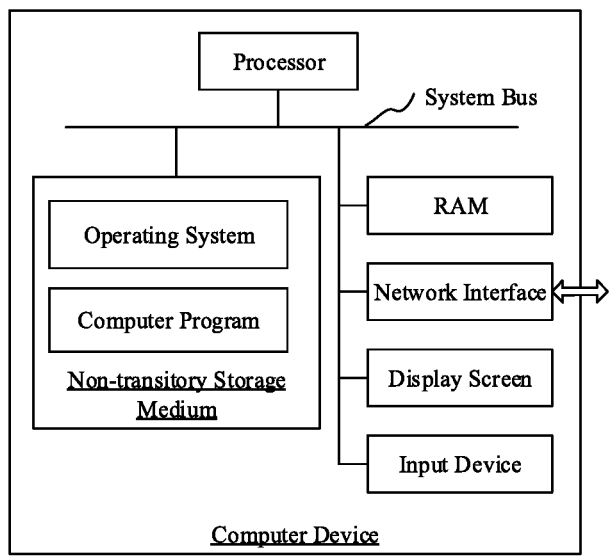
FIG. 7 is a schematic diagram of a computer device according to an embodiment.

In an embodiment, a computer device is provided, which may be a server whose internal structure may be as shown in FIG. 7. The computer device includes a processor, a memory, a network interface, a display screen and an input device connected through a system bus. The processor of the computer device is configured to provide computing and control capabilities. The memory of the computer device includes a non-transitory storage medium and a Random-Access Memory (RAM). The non-transitory storage medium stores an operating system and a computer program. The RAM provides an environment for the operation of the operating system and the computer program in the non-transitory storage medium. The network interface of the computer device is configured to communicate with external terminals via a network connection. The computer program is executed by the processor to implement a control method of a drive assistance system. The display screen of the computer device may be a liquid crystal display screen or an electronic ink display screen, and the input device of the computer device may be a touch layer covered on the display screen, or be a key, a trackball or a touch pad set on the housing of the computer device, or may be an external keyboard, touch pad or mouse. The processor executes the computer program to perform a method of processing point cloud data based on a neural network.

Those skilled in the art will appreciate that the structure shown in FIG. 7 is merely a block diagram of a portion of the structure associated with the solution of the present disclosure, and does not constitute a limitation on the computer device to which the solution of the present disclosure is applied, a particular computer device may include more or less components, or combine certain components, or with a different arrangement of components.

In an embodiment, a computer device is provided, which includes a memory and a processor, the memory stores a computer program which, when executed by the processor, causes the processor to perform the steps of:

acquiring first point set data and second point set data; the first point set data and the second point set data respectively representing a point data set of an outer surface of a target object in different shapes;

processing the first point set data using structure parameters of the preset neural network to obtain a multi-scale feature of each point in the first point set data;

the structure parameters include a collection abstraction layer parameter, a feature propagation layer parameter, and a fully connected layer parameter;

acquiring a first displacement vector of each point in the first point set data according to the multi-scale feature and a preset noise; and acquiring target point set data according to the first displacement vector, the first point set data, and the second point set data.

In an embodiment, a computer-readable storage medium is provided, which stores a computer program, which when executed by a processor, causes the processor to perform:

acquiring first point set data and second point set data; the first point set data and the second point set data respectively representing a point data set of an outer surface of a target object in different shapes;

processing the first point set data using structure parameters of the preset neural network to obtain a multi-scale feature of each point in the first point set data; the structure parameters include a collection abstraction layer parameter, a feature propagation layer parameter, and a fully connected layer parameter;

acquiring a first displacement vector of each point in the first point set data according to the multi-scale feature and a preset noise; and acquiring target point set data according to the first displacement vector, the first point set data, and the second point set data.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random-access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present invention, and are not intended to limit the protection scope of the present disclosure. It should be noted that any variation or replacement readily figured out by persons skilled in the art within the technical concepts disclosed in the present disclosure shall all fall into the protection scope of the present disclosure. Therefore, the protection scope of the present disclosure shall be subject to the appended claims.

What is claimed is:

1. A method of processing point cloud data based on a neural network, comprising:
    acquiring first point set data and second point set data; the first point set data and the second point set data respectively representing a point data set of an outer surface of a target object in different shapes;
    processing the first point set data using structure parameters of the preset neural network to obtain a multi-scale feature of each point in the first point set data; the structure parameters comprising a collection abstraction layer parameter, a feature propagation layer parameter, and a fully connected layer parameter;
    acquiring a first displacement vector of each point in the first point set data according to the multi-scale feature and a preset noise; and
    acquiring target point set data according to the first displacement vector, the first point set data, and the second point set data.

2. The method of claim 1, wherein the acquiring the target point set data according to the first displacement vector, the first point set data, and the second point set data comprises:
    acquiring first prediction point set data according to the first displacement vector and the first point set data;
    acquiring a geometric loss between the second point set data and the first prediction point set data according to a preset geometric loss calculation method; wherein the geometric loss is configured to measure a difference in geometric shape between the first prediction point set data and the second point set data; and
    determining the target point set data according to the geometric loss.

3. The method of claim 2, wherein the determining the target point set data according to the geometric loss comprises:
    if the geometric loss is less than a preset threshold, determining the first prediction point set data as the target point set data; and
    if the geometric loss is not less than the preset threshold, adjusting the structure parameters, and returning to the step of using the adjusted structure parameters to process the first point set data to obtain a multi-scale feature of each point in the first point set data.

4. The method of claim 2, wherein the acquiring the geometric loss between the second point set data and the first prediction point set data according to the preset geometric loss calculation method comprises:
    calculating a shape matching loss value according to a shape matching loss function, the second point set data, and the first prediction point set data;
    calculating a density loss value according to a density loss function, the second point set data, and the first prediction point set data; and
    determining the geometric loss according to the shape matching loss value and the density loss value.

5. The method of claim 4, wherein the shape matching loss function comprises:

$$L_{shape}(\hat{Y}, Y) = \sum_{p \in Y} \min_{q \in \hat{Y}} d(p, q) + \sum_{q \in \hat{Y}} \min_{p \in Y} d(p, q);$$

wherein Y represents the second point set, $\hat{Y}$ represents the first prediction point set data, p represents points in the second point set data, q represents points in the first prediction point set data, and d(p,q) represents an Euclidean distance between p points and q points, and $L_{shape}(\hat{Y},Y)$ represents the shape matching loss value corresponding to the geometric loss between the first prediction point set data $\hat{Y}$ and the second point set data Y;

wherein the density loss function comprises:

$$L_{density}(\hat{Y}, Y) = \frac{1}{k} \sum_{p \in Y} \sum_{i=1}^{k} |d(p, N_i(Y, p)) - d(p, N_i(\hat{Y}, p))|;$$

wherein $N_i(Y,p)$ represents the ith point closest to the point p in the Y point set, $N_i(\hat{Y},p)$ represents the ith point closest to the point p in the $\hat{Y}$ point set, k represents the number of points closest to the point p in the Y point set or the number of points closest to the point p in the $\hat{Y}$ point set, $d(p,N_i(Y,p))$ represents the Euclidean distance between a p point and a point in the Y point set closest to the p point; $d(p,N_i(\hat{Y},p))$ represents the Euclidean distance between a p point and a point in the $\hat{Y}$ point set closest to the p point; and $L_{density}(\hat{Y},Y)$ represents the density loss value corresponding to the geometric loss between the first prediction point set data $\hat{Y}$ and the second point set data Y.

6. The method of claim 1, wherein after the acquiring the first displacement vector of each point in the first point set data according to the multi-scale feature and the preset noise, the method further comprises:
    acquiring a normalization loss between the first displacement vector and a second displacement vector according to a preset cross-normalization calculation method; wherein the second displacement vector is a displacement vector of each point of the second point set data; and the normalization loss is configured to measure parallelism between the first displacement vector and the second displacement vector;
    updating the first displacement vector according to the normalization loss to acquire a third displacement vector;

wherein the acquiring the target point set data according to the first displacement vector, the first point set data, and the second point set data comprises:
acquiring the target point set data according to the third displacement vector, the first point set data, and the second point set data.

7. The method of claim 6, wherein the cross-normalization calculation method comprises:

$$L_{reg}(X,Y) = \sum_{p \in X} \min_{q \in Y} d([p, p+I_X(p)], [q+I_Y(q), q]) + \sum_{q \in Y} \min_{p \in X} d([p, p+I_X(p)], [q+I_Y(q), q]);$$

wherein $I_X(p)$ represents the first displacement vector corresponding to the p point in the X point set, $I_Y(q)$ represents the first displacement vector corresponding to the q point in the Y point set, $L_{reg}(X,Y)$ represents the normalization loss value between the first displacement vector and the second displacement vector, and $d([p,p+I_X(p)],[q+I_Y(q),q])$ represents the Euclidean distance between vectors $[p,p+I_X(p)]$ and $[q+I_Y(q),q]$.

8. A computer device comprising a memory and a processor, the memory storing a computer program which, when executed by the processor, causing the processor to perform the steps of:
acquiring first point set data and second point set data; the first point set data and the second point set data respectively representing a point data set of an outer surface of a target object in different shapes;
processing the first point set data using structure parameters of the preset neural network to obtain a multi-scale feature of each point in the first point set data; the structure parameters comprising a collection abstraction layer parameter, a feature propagation layer parameter, and a fully connected layer parameter;
acquiring a first displacement vector of each point in the first point set data according to the multi-scale feature and a preset noise; and
acquiring target point set data according to the first displacement vector, the first point set data, and the second point set data.

9. A computer-readable storage medium storing a computer program which, when executed by a processor, causing the processor to perform the steps of:
acquiring first point set data and second point set data; the first point set data and the second point set data respectively representing a point data set of an outer surface of a target object in different shapes;
processing the first point set data using structure parameters of the preset neural network to obtain a multi-scale feature of each point in the first point set data; the structure parameters comprising a collection abstraction layer parameter, a feature propagation layer parameter, and a fully connected layer parameter;
acquiring a first displacement vector of each point in the first point set data according to the multi-scale feature and a preset noise; and
acquiring target point set data according to the first displacement vector, the first point set data, and the second point set data.

* * * * *